United States Patent [19]
McGovern et al.

[11] Patent Number: 6,050,765
[45] Date of Patent: Apr. 18, 2000

[54] FASTENER FOR LOGS AND FASTENING TECHNIQUE THEREFOR

[75] Inventors: Hubert T. McGovern; Todd W. Emmonds, both of Westfield, Mass.

[73] Assignee: Olympic Manufacturing Group, Inc., Agawam, Mass.

[21] Appl. No.: 09/138,278

[22] Filed: Aug. 21, 1998

[51] Int. Cl.[7] .............................. F16B 25/00; F16B 35/06
[52] U.S. Cl. ........................ 411/387.2; 411/399; 52/233
[58] Field of Search ................................ 411/2–5, 386, 411/387.2, 399; 52/233, 730.7

[56] References Cited

U.S. PATENT DOCUMENTS

| | | | |
|---|---|---|---|
| 3,358,548 | 12/1967 | Dyslin | 411/12 X |
| 3,869,219 | 3/1975 | Wilson et al. | 411/387.2 |
| 4,881,861 | 11/1989 | Hewison | 411/387.2 |
| 5,400,845 | 3/1995 | Choiniere et al. | 411/399 X |
| 5,516,248 | 5/1996 | DeHaitre | 411/399 |

*Primary Examiner*—Neill Wilson
*Attorney, Agent, or Firm*—Alix, Yale & Ristas, LLP

[57] ABSTRACT

A fastener for fastening together logs and a technique therefor is directed to a self-drilling/tapping fastener which allows the fastener to be driven through the log to be secured without pre-drilling a bore. Counter-bore wings on shaft segment of the fastener shank increase the diameter of the bore formed in the log to be fastened by the threaded segment of the shank, reducing friction caused by contact between the shaft segment and the bore. Counter-bore fins on the fastener head also form a counter-bore for the head. A lubricous coating applied to a portion of the shank accommodates settling of the logs and facilitates installation.

16 Claims, 4 Drawing Sheets

FASTENER FOR LOGS AND FASTENING TECHNIQUE THEREFOR

BACKGROUND OF THE INVENTION

This invention relates generally to fasteners and fastening techniques for fastening logs. More particularly, the present invention relates to fasteners and techniques for fastening together wood beams, landscape timbers and the logs of a log home.

Log homes which are manufactured from pre-shaped logs formed in an efficient, mass production process are now common-place. The pre-formed logs are transported to the building site, and the log home is constructed in a highly efficient process. The construction process conventionally involves fastening together the logs which form the walls of the home. Because the logs have a substantial thickness, typically on the order of 6 inches or more, and because over time there is ordinarily significant settling and displacement of the connected logs subsequent to construction, the fastening process is not entirely straightforward.

One wide spread conventional log fastening technique involves drilling a hole in the log that is to be secured on top of a bottom secured log. A counter-sink is also drilled. After the hole and counter-sink are formed, a large spiral nail or a common nail is driven through the hole into the bottom securing log, or a long screw is inserted through the pre-drilled hole and threaded into the bottom log. The fastener head is driven into the counter-sink. U.S. Pat. No. 5,400,845, assigned to the assignee of the subject application, discloses a self-drilling/tapping fastener which is driven through the log that is to be secured without pre-drilling a bore. In log construction a limited free movement of the logs must be accommodated since over the lifetime of the log home, the logs ordinarily will shrink and will also settle. In addition, the fastening technique must be accomplished without splitting the logs.

Summary of the Invention

Briefly stated, the invention in a preferred form is a fastener for fastening together the logs which are used to construct log homes. The fastener is configured to ream the bore formed in the new log, reducing the torque required to install the fastener and facilitating limited relative movement of the logs due to shrinkage and settling. The invention also encompasses the fastening technique for fastening together such logs.

In accordance with the invention, the log fastener includes a head which is adapted to receive a driver for application of a torque. A shank extends from the head and terminates in a self-drilling point. The shank has a shaft segment of generally uniform diameter and a threaded segment which threads into the secured log. The shaft segment includes a pair of radially extending wings which upon torquing the fastener ream the bore in the new log, increasing the diameter of the bore and thereby reducing friction between the shaft segment and the new log. The fastener may include a pair of fins under the head which upon torquing the fastener, self-tap the counter-bore so that the head may be sunk below the surface of the new log. A lubricous coating is applied to the shank to allow for settling of the logs. The coating also eliminates a significant amount of friction, further reducing the torque required during installation.

An object of the invention is to provide a new and improved fastener and technique for fastening together pre-formed building logs.

Another object of the invention is to provide a new and improved fastener and fastening technique which allow pre-formed logs to be connected in a highly efficient and cost effective manner.

A further object of the invention is to provide a new and improved technique wherein logs may be fastened together in an efficient manner which allows for subsequent settling and movement of the logs and does not result in splitting of the logs or compromising their structural integrity.

A yet further object of the invention is to provide a new and improved fastener and technique which requires less torque for installation.

Other objects and advantages of the invention will become apparent from the drawings and the specification.

DETAILED DESCRIPTION OF THE PREFERRED EMBODIMENT

Figure 1:
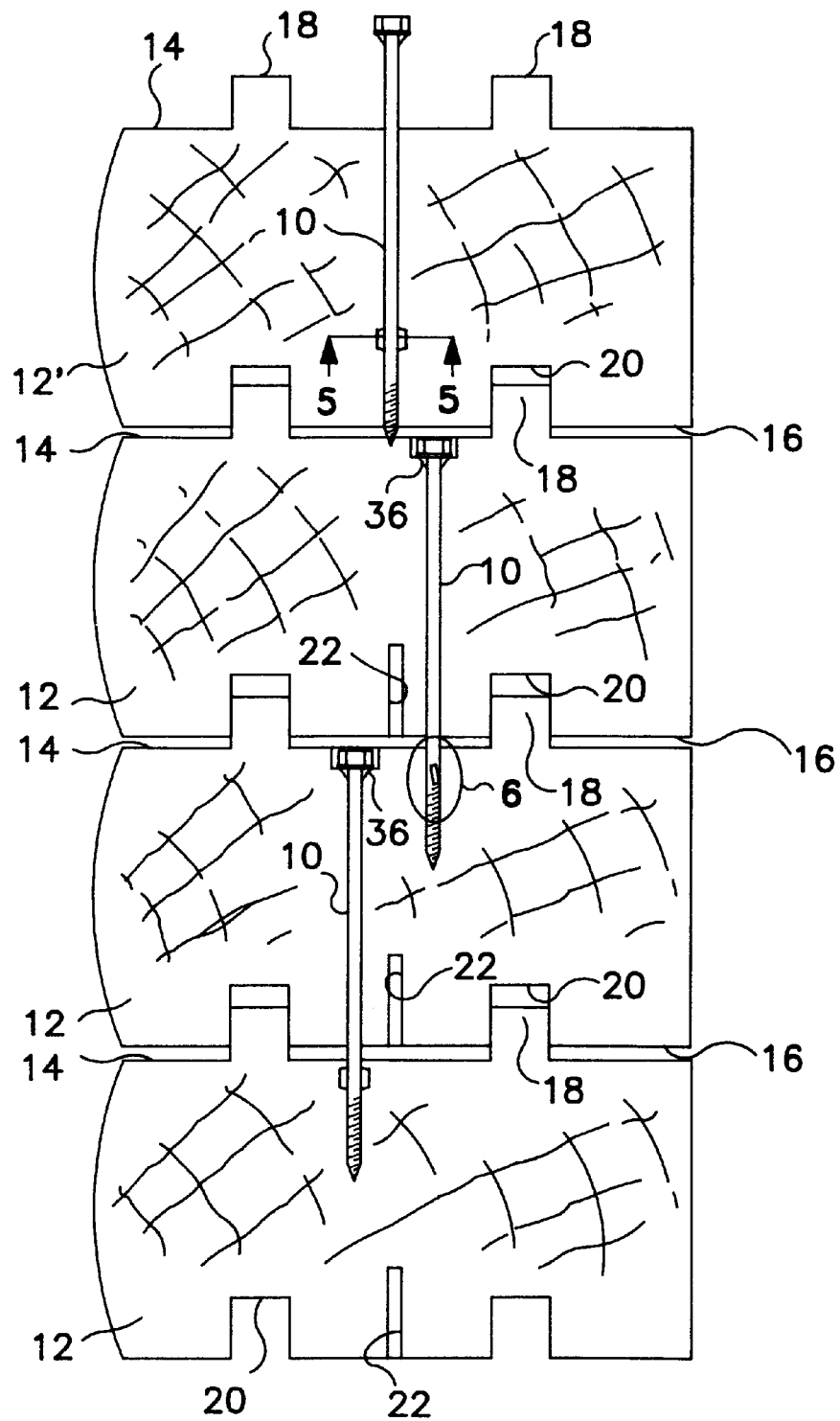
FIG. 1 is a schematic view illustrating logs which have been connected together by fasteners in accordance with the present invention.

With reference to the drawings wherein like numerals represent like parts throughout the Figures, a log fastener in accordance with the present invention is generally designated by the numeral 10. Log fastener 10 is especially adapted for fastening together a new, unsecured log 12' to an adjacent, secured log 12 or logs in constructing a log home. The logs 12, 12', which are illustrated in FIG. 1, are preformed and may assume a wide variety of shapes and configurations. The logs 12, 12' typically have substantial thicknesses which may commonly be on the order of 6, 8, 10 inches or even greater thicknesses. The logs 12, 12' are formed in an efficient, mass produced process which provides a generally uniform shape so as to produce generally uniformly spaced upper and lower planar surfaces 14, 16. The logs 12, 12' also typically have various tongues 18, grooves 20, slots 22 and notches (not illustrated) which are used in the construction process. The fastener 10 may also have application in fastening together beams, landscape ties, rails, etc. which have a substantial thickness.

Figure 2:
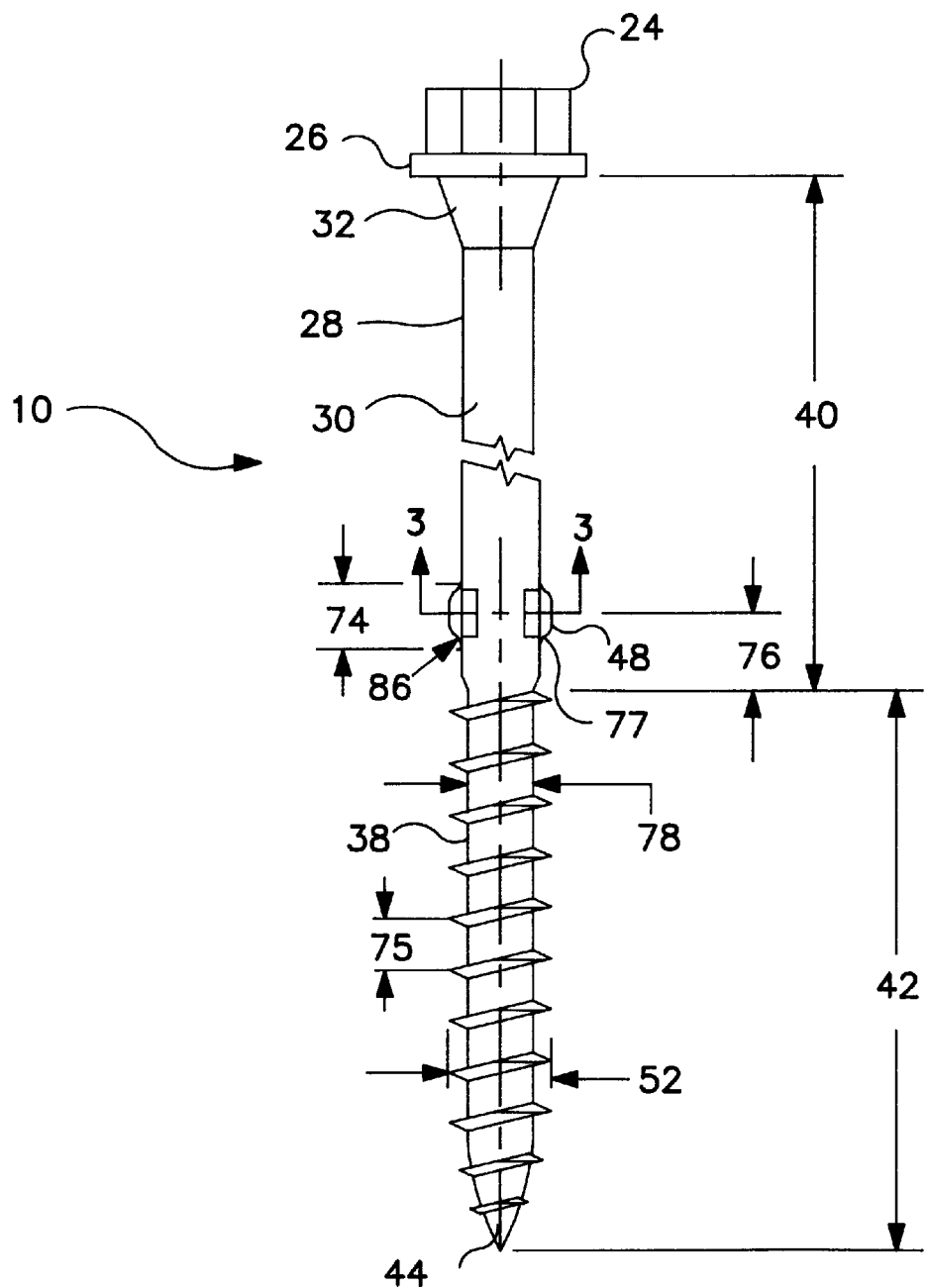
FIG. 2 is an enlarged elevational frontal view, partly broken away, of a fastener in accordance with the present invention.
Figure 3:
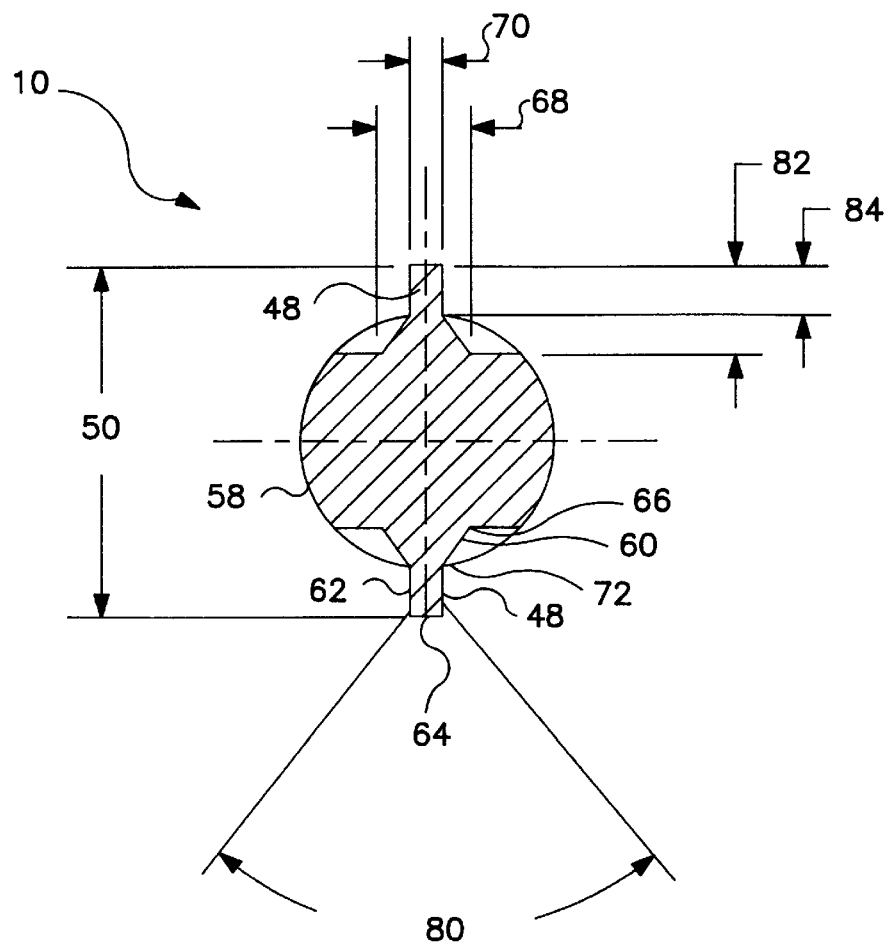
FIG. 3 is a cross section view of the fastener taken along line 3—3 of FIG. 2.
Figure 4:
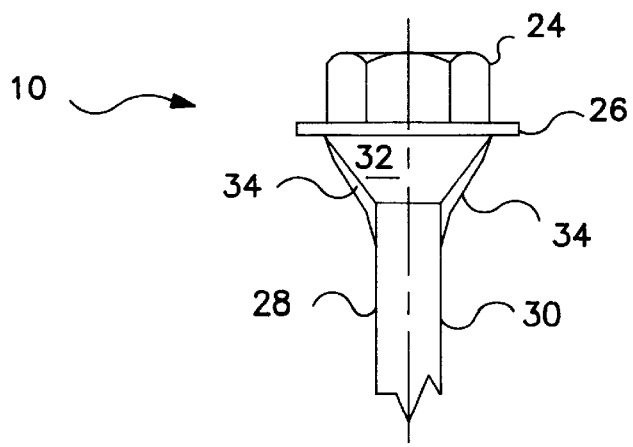
FIG. 4 is an enlarged, fragmentary, side view of the fastener of FIG. 2.

With reference to FIGS. 2 through 4, fastener 10 includes an integral hex head 24, flange 26, and shank 28. The shank 28 is comprised of a shaft segment 30 having a substantially uniform diameter and a transition segment 32 disposed intermediate the shaft segment 30 and the flange 26. The transition segment 32 has a frustoconical shape where the diameter adjacent the flange 26 is greater than the diameter adjacent the shaft segment 30. In a preferred embodiment, a pair of diametrically opposed fins 34 project radially outward from the transition segment 32 and a portion of the shaft segment 30. The fins 34 are configured so that when the fins 34 engage the top surface 14 of the log 12' and the fastener 10 is torqued, the fins 34 drill a counter-bore 36. The head 24 may thus be countersunk into the new log 12' as part of the fastener driving process. Alternatively, the counter-bore 36 may be drilled as a separate operation and the fins eliminated.

Figure 5:
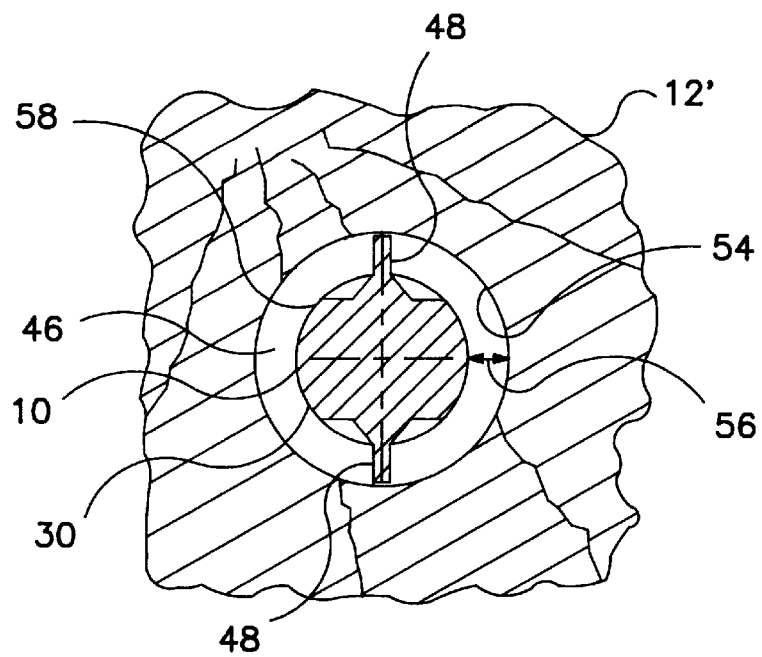
FIG. 5 is an enlarged, fragmentary, cross section view of the fastener and new log taken along line 5—5 of FIG. 1.

The shaft segment 30 is dimensioned to axially extend a distance 40 substantially equal to the entire thickness of the log 12, 12'. The shank 28 also includes a threaded segment 38 which typically axially extends a distance 42 on the order of two (2) inches. The threaded segment 38 terminates in a point 44 of a type known in the art for self-drilling a bore 46 into the logs 12, 12' (FIG. 5).

A pair of diametrically opposed wings 48 project outwardly from the shaft segment 30 of the shank 28. Preferably, the outer diameter 50 of the wings 48 is substantially equal to the thread diameter 52. With further reference to FIG. 5, the wings 48 ream the bore wall 54 behind the thread segment 38, thereby enlarging the diameter of the bore 46, as the fastener 10 is driven into the new log 12', as shown in FIG. 5. The gap 56 between the surfaces 58 of the shaft segment 30 and the bore wall 54 minimizes engagement between the shaft segment 30 and the bore wall 54, reducing the friction between the new log 12' and the fastener 10 and allowing the fastener 10 to be installed with less torque. The clearance 56 also facilitates relative movement between the fastener 10 and the new log 12' due to log shrinkage or settling.

With reference to FIG. 3, each of the wings 48 has a base 60 and an extension portion 62 extending from the base 60 to a cutting edge 64. The extreme axial ends of the cutting edge 64 may be beveled. The base 60 has a trapezoidal cross-section, such that the bottom 66 of the base 60 has a width 68 which is wider than the width 70 of the top 72 of the base 60, to provide better mechanical support to the extension portion 62. The radially inner, bottom 66 of the base 60 is set below the surface 58 of the shaft segment 30 and the height of the base is selected such that the radially outer, top 72 of the base 60 does not extend beyond the surface 58 of the shaft segment 30, ensuring that there is no contact between the base 60 and the material of the new log 12'. The length 74 (FIG. 2) and width 70 of the extension portion 62 are selected to provide a cross-sectional area which is great enough to provide the mechanical strength required to remove material from the bore wall 54 while minimizing the contact between the wings 48 and the log material to reduce friction therebetween. For example, the length 74 of the extension portion is substantially equal to the distance 75 between adjacent threads to optimize the reaming characteristics of the cutting edge 64 while minimizing the surface area.

Figure 6:
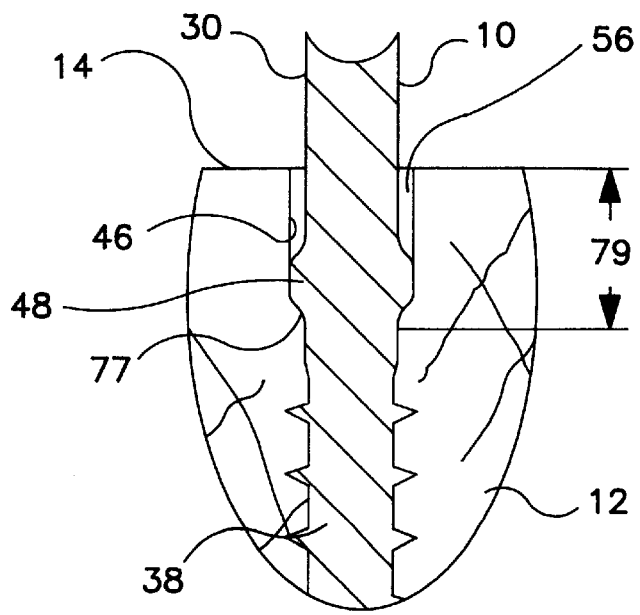
FIG. 6 is an enlarged cross section view of Area 6 of FIG. 1.

In the embodiment shown in FIG. 2, the wings 48 are positioned at an axial distance 76 from the threaded segment 38. The length 74 of the extension portion 62 and the length of the distance 76 are selected such that the lead end 77 of the extension portion 62 penetrates the upper surface 14 of the secured log 12 and enlarges the drilled bore 46 of the secured log 12 immediately adjacent the upper surface 14 of the secured log 12 (FIG. 6). This ensures that the full length of the drilled bore 46 in the new log 12' is enlarged by the wings 48, minimizing the friction between the new log 12' and the shaft segment 30 of the fastener 10.

Settling and shifting of the log home can result in lateral relative movement between adjacent logs 12, 12'. Since the fasteners 10 have a relatively small cross section, such lateral relative movement can result in failure of the fastener 10 if the force resulting from such movement is applied as a shear force. Enlarging the bore 46 immediately adjacent the interface between the bottom surface 16 of the new log 12' and the top surface 14 of the secured log 12 eliminates contact between the fastener 10 and the bore 46 at the interface. Consequently, the force applied by the secured log 12 on the fastener 10 in the event of lateral movement between the secured log 12 and the new log 12' will cause the fastener 10 to bend rather than shear. Therefore, the minimum value of the length 79 of the penetration is selected such that the force generated by lateral relative movement between the logs 12, 12' will result in a bending force rather than in a shear force. The maximum value of the length 79 of the penetration is selected such that the thread connection between the threaded segment 38 of the shank 28 and the secured log 12 will not be compromised.

After the fastener 10 has been fabricated, the shank 28 is preferably coated with a lubricous coating (partially illustrated). The coating aids in the installation by further lessening the friction during the installation process. In addition, the lubricous coating will allow the logs 12, 12' to settle by providing a limited degree of lubricated movement along the fastener shank 28. In the preferred form, the lubricous coating is a Xylan™ coating which contains Teflon™ and is applied via a fluorocarbon.

With reference to FIG. 1, the logs 12, 12' are fastened together by applying a torque to the fasteners 10 without initially pre-drilling either a through bore or a counter-bore into the new log 12'. Preferably, a fastener holder attachment is used in conjunction with an automatic screw gun (neither illustrated) to support the fastener 10 and ensure that a sufficient downward force is exerted on the fastener 10 for threading the fastener 10 through the new log 12' and into the secured log 12. The fastener 10 self-drills and self-taps into the logs 12, 12', and as it does so, forms a bore 46 which is dimensioned to receive the shaft segment 30. As the fastener 10 is driven downwardly, the pair of wings 48 enter the bore 46 and function to enlarge the diameter of the bore 46 to reduce contact between the shaft segment 30 and the bore wall 54 and thereby reduce friction therebetween. As the fastener 10 is driven further downwardly, the pair of fins 34 function to form a counter-bore 36 for sinking the head 24 below the top surface 14 of the new log 12'. The shaft segment 30 and the threaded segment 38 are dimensioned so that the fastener 10 only threadably engages the secured (bottom) log 12 when the fastener 10 is fully driven. The lubricous coating facilitates the installation process.

In one embodiment of the invention which is adapted for a new log 12' having a nominal thickness of approximately 8 inches, the total length of the transition segment 32 and the shaft segment 30 is approximately 8 inches and the length of the threaded segment 38 is approximately 2 inches. The diameter of the flange 26 is approximately 0.445 inches. The diameter of the intermediate shaft segment 30 is approximately 0.189 inches. The root diameter 78 of the threaded segment 38 is 0.172 inches and the thread diameter 52 is 0.260 inches. The diameter 50 of the pair of wings 48 is 0.260 inches. The length 74 of each wing 48 is 0.128 inches and the distance 76 from the mid-point of each wing 48 to the threaded segment 38 may be 0.125 to 0.250 inches and preferably is 0.200 inches. The width 70 of the top 72 of the base 60 and the extension portion 62 of each wing 48 is 0.020 inches, the width 68 of the bottom 66 of the base 60 is 0.070 inches, and the angle 80 formed by the sides of the base 60 is 80–90°. The height 82 of the wing 48 is 0.068 inches, the height 84 of the extension portion 62 is 0.037 inches, and the radius 86 formed between the leading edge of the extension portion 62 and the surface 58 of the shaft segment 30 is 0.074 inches (FIG. 2).

Table 1 provides test results comparing the performance of a standard (std.) ten (10) inch threaded fastener with a first ten (10) inch wing fastener (wing) in accordance with the invention having no lubricous coating and with a second ten (10) inch wing fastener (wing) in accordance with the invention having a coating of Xylan™. The test logs were composed of pressure treated wood (PT), southern yellow pine (SthYwPine), or oak (OAK). The data provided in the table includes the start and finish times, the max torque required to install each fastener, the % change in the max torque from the subject fasteners to the conventional fastener, the total force (represented by the total area) required to install each fastener, and the % change in the total force from the subject fasteners to the conventional fastener.

The test results provided in Table 1 show that the maximum torque and total force required to install a fastener 10 in accordance with the present invention is less than that required to install a comparable length conventional fastener in pressure treated wood and southern yellow pine, two of the most common building materials. For example, the maximum torque and total force required to install the fastener 10 in pressure treated wood was reduced by at least thirty percent (30%) and twenty-one percent (21%), respectively. Similarly, the maximum torque and total force required to install the fastener 10 in southern yellow pine was reduced by at least ten percent (10%) and eighteen percent (18%), respectively. The test results also indicate that although the maximum torque required to install fastener 10 in oak is less than that required to install a conventional fastener, the total force is approximately the same.

While a preferred embodiment of the foregoing invention is set forth for purposes of illustration, the foregoing description should not be deemed a limitation of the invention herein. Accordingly, various modifications, adaptations and alternatives may occur to one skilled in the art without departing from the spirit and the scope of the present invention.

point for self-drilling said fastener by forming a bore in each of said wood members; and at least one wing extending laterally from said shaft segment and positioned at a predetermined longitudinal distance from said threaded segment whereby said wing is disposed in said bore of said first wood member when said fastener is installed.

2. The fastener of claim 1 wherein said first and second wood members each have first and second oppositely disposed surfaces, said second surface of said first wood member being adjacent said first surface of said second wood member, and said distance is a predetermined value whereby said wing is disposed adjacent said second surface of said first wood member.

3. The fastener of claim 1 wherein said wing has a width and a length selected to provide a cross-sectional area having sufficient mechanical strength to ream said bore of said first wood member while minimizing contact between said wing and said bore of said first wood member.

4. The fastener of claim 1 wherein first and second wings extend laterally from said shaft.

5. The fastener of claim 4 wherein said cutting edge of said first and second wings define a diameter and said threaded segment of said shank defines a thread diameter, wherein said diameter of said first and second wings is substantially equal to said thread diameter.

6. A fastener for fastening a first wood member to a second wood member, at least said first wood member having a substantial pre-established thickness, comprising:

a head comprising means for receiving a torque applied thereto;

a shank extending from said head, said shank having a first shaft segment of generally uniform diameter and a second threaded segment, said shank terminating in a

TABLE 1

| SCREW TYPE | Xylan CLEAR COAT | WOOD | TIME (sec) | | MAX TORQUE | | TOTAL AREA | |
|---|---|---|---|---|---|---|---|---|
| | | | start | finish | lb-in | % CHANGE | lb-in-sec | % CHANGE |
| std. | Y | PT | 1.0 | 9.0 | 50.8 | — | 290 | — |
| wing | Y | PT | 1.0 | 9.1 | 35.9 | 30 | 225 | 22 |
| wing | N | PT | 1.0 | 9.0 | 34.2 | 33 | 227 | 21 |
| std. | Y | SthYwPine | 1.0 | 9.1 | 58.6 | — | 343 | — |
| wing | Y | SthYwPine | 1.0 | 9.0 | 42.6 | 27 | 259 | 24 |
| wing | N | SthYwPine | 1.1 | 9.0 | 45.5 | 22 | 280 | 18 |
| std. | Y | SthYwPine | 1.0 | 9.0 | 64.4 | — | 372 | — |
| wing | Y | SthYwPine | 1.1 | 9.0 | 57.6 | 10 | 296 | 20 |
| wing | N | SthYwPine | 1.0 | 9.0 | 50.6 | 21.0 | 295 | 20 |
| std. | Y | SthYwPine | 1.1 | 9.0 | 74.9 | — | 428 | — |
| wing | Y | SthYwPine | 1.1 | 9.0 | 59.6 | 20.0 | 341 | 20 |
| wing | N | SthYwPine | 1.1 | 9.0 | 61.8 | 17.0 | 345 | 19 |
| std. | Y | OAK | 1.0 | 9.1 | 102.0 | — | 621 | — |
| wing | Y | OAK | 1.1 | 9.1 | 82.3 | 19.0 | 586 | 6 |
| wing | N | OAK | 1.0 | 9.0 | 86.2 | 15.0 | 632 | -2 |
| std. | Y | OAK | 1.0 | 9.1 | 87.1 | — | 503 | — |
| wing | Y | OAK | 1.0 | 9.1 | 85.9 | 1.0 | 507 | -1 |
| wing | N | OAK | 1.0 | 9.1 | 80.9 | 7.0 | 556 | -9 |

What is claimed is:

1. A fastener for fastening a first wood member to a second wood member, at least said first wood member having a substantial pre-established thickness, comprising:

a head comprising means for receiving a torque applied thereto;

a shank extending from said head, said shank having a first shaft segment of generally uniform diameter and a second threaded segment, said shank terminating in a point for self-drilling said fastener by forming a bore in each of said wood members; and at least one wing extending laterally from said shaft segment, said wing comprising a base portion and an extension portion laterally extending from said base to a cutting edge, said base having a substantially trapezoidal cross-section.

7. The fastener of claim 6 wherein said shaft segment has a surface and said base has a radially inner bottom and a radially outer top, wherein said bottom of said base is positioned below said surface of said shaft segment and said top of said base is positioned adjacent said surface of said shaft segment.

8. A fastener for fastening a first wood member to a second wood member, at least said first wood member having a substantial preestablished thickness, comprising:

a head comprising means for receiving torque applied thereto;

a shank extending from said head, said shank having a first shaft segment of generally uniform diameter and second threaded segment defining a distance between adjoining threads, said shank terminating at a point for drilling said fastener by forming a bore on each of said wood members; and at least one wing extending laterally from said shaft segment and having an axial length which is substantially equal to the distance between adjoining threads of said threaded segment.

9. A fastener for fastening a first wood member to a second wood member, at least said first wood member having a substantial pre-established thickness, comprising:

a head comprising means for receiving a torque applied thereto;

a shank extending from said head, said shank having a first shaft segment of generally uniform diameter and a second threaded segment, said shank terminating in a point for self-drilling said fastener by forming a bore in each of said wood members;

at least one wing extending laterally from said shaft segment; and a lubricous coating applied to said shank.

10. A log assembly comprising:

a first log having a pre-established thickness and means defining a bore and a bore wall;

a second log; and a fastener fastening said first log to said second log, said fastener comprising a shank extending through said bore and having a threaded portion which is engaged in said second log and a shaft segment of generally uniform diameter which extends substantially the entire thickness of said first log, and reamer means laterally extending from said shaft segment for reaming said bore and forming a gap between said shaft segment and said bore wall.

11. The log assembly of claim 10 wherein said reamer means is positioned at a longitudinal distance from said threaded segment.

12. The log assembly of claim 11 wherein said distance is a predetermined value whereby said reamer means is disposed in said bore of said second log when said fastener is installed.

13. The log assembly of claim 12 wherein said first and second logs each have first and second oppositely disposed surfaces, said second surface of said first log being adjacent said first surface of said second log, and said distance is a predetermined value whereby said reamer means is disposed adjacent said first surface of said second log.

14. A technique for fastening together a first log to a second log comprising:

(a). providing a fastener having a self-tapping point, a distal threaded segment, an intermediate shaft segment of generally uniform diameter, a pair of laterally extending wings disposed on said shaft segment, and a head; and (b). without pre-drilling a bore for said fastener, driving said fastener through said first log so that said fastener thread engages said second log, said self-tapping point forming a bore through said first log having a bore wall and a partial bore in said second log, said pair of wings reaming said bore in said first log while said fastener is being driven and forming a gap between said shaft segment and said bore wall.

15. The fastening technique of claim 14 wherein said fastener is driven so that said pair of wings is disposed only in said second log when said first log is fastened to said second log.

16. The fastening technique of claim 14 wherein said first and second logs each have first and second oppositely disposed surfaces, said second surface of said first log being adjacent said first surface of said second log and said fastener is driven so that said pair of wings is disposed in said bore of said second log adjacent said first surface when said first log is fastened to said second log.

* * * * *